May 21, 1929.  C. V. MOLNÁR  1,714,433

GAME APPARATUS

Filed Jan. 14, 1927  7 Sheets-Sheet 1

Charles V. Molnár
INVENTOR

BY Victor J. Evans
ATTORNEY

WITNESS: J. T. L. Wright

May 21, 1929. C. V. MOLNÁR 1,714,433
GAME APPARATUS
Filed Jan. 14, 1927   7 Sheets-Sheet 2

Charles V. Molnár INVENTOR
BY Victor J. Evans
ATTORNEY
WITNESS: J.T.L. Wright

May 21, 1929.  C. V. MOLNÁR  1,714,433
GAME APPARATUS
Filed Jan. 14, 1927   7 Sheets-Sheet 3

May 21, 1929.  C. V. MOLNÁR  1,714,433
GAME APPARATUS
Filed Jan. 14, 1927   7 Sheets-Sheet 5

Patented May 21, 1929.

1,714,433

UNITED STATES PATENT OFFICE.

CHARLES V. MOLNÁR, OF BRADDOCK, PENNSYLVANIA.

GAME APPARATUS.

Application filed January 14, 1927. Serial No. 161,225.

The object of this invention is to provide a structure including a track formed in sections and comprising a plurality of parallel channels adapted to guide marbles or other spherical objects along a straight, spiral, or tortuous track, and from a slight elevation to a point near the base,—this structure being employed for playing a game in which the individual players each use a marble or the like, all of these elements being played simultaneously, and the first one reaching a given point along the path of travel, or reaching the end of that path, being regarded as having scored, or as winning the game, as the case may be.

A further object is to provide a knockdown structure, which may be erected in a number of different ways, all of the forms being suitable for use in playing the game.

A further object is to provide multiple channels forming sections of the complete track, these elements being connected in a certain novel manner, and being mounted with reference to a plurality of posts or pillars, in the particular way hereinafter disclosed.

A further object is to provide a knockdown structure having special value as a mechanical toy or educational device, useful in teaching principles of mechanics, and requiring the exercise of some degree of skill in the assembly of the parts, the numerous forms which can be developed tending to increase the ability and capacity of the worker.

With the foregoing and other objects in view, the invention consists in the novel construction and arrangement of elements described, illustrated and claimed, it being understood that modifications may be made within the scope of the claims without departing from the spirit of the invention.

In the drawings forming part of this application,

Figure 18 is a plan view of a track section including a widened portion in which vertical pins are mounted, for the purpose of causing the marbles to move in an irregular path, thereby increasing the time element, considering the period lapsing between the star and finish, representing the complete course.

Figure 18$^a$ is a section on line 18$^a$ of Figure 18.

Figure 19 is a plan view of one of the track sections, including steps or the like.

Figure 19$^a$ is an edge elevation of the device of Figure 19.

Figure 20 is an edge elevation, showing a track section curved downwardly to form a "dip".

Figure 21 is an edge elevation of a track section formed with a loop.

Figure 21$^a$ shows the structure of Figure 21, in perspective.

Figure 22 is an elevation of a post section or pillar, the element being provided with a plurality of series of slots for mounting brackets to support the track sections.

Figure 22$^a$ shows another post section, forming an extension top member.

Figures 23 and 24 show shorter post sections.

Figures 25 and 25$^a$ show one of the brackets to be connected with the post sections for securing the track sections in position.

Figure 26 is an elevation of a member constituting an extension for one of the brackets.

Figure 26$^a$ is a section on line 26$^a$—26$^a$ of Figure 26.

Figure 27 shows a dished element which may be employed in the central portion of a structure like that shown in Figure 49, toward which several track sections are inclined.

Figure 28 is a plan view of another of these central elements, this device having portions inclined from the center downwardly, and tending to spread the marbles in different directions.

Figure 29 is a further form of a centrally mounted member.

Figures 34 and 34$^a$ show a base member for supporting one of the posts when the latter is directly resting upon the base of the structure, instead of being connected with slotted portions thereof.

Figures 36 and 36ᵃ show a cap member for one of the vertical posts, or any of them, and useful when an element is to rest upon the top of a post which may be shorter than the others.

Figure 37 is a detail referred to below.

Figure 1:
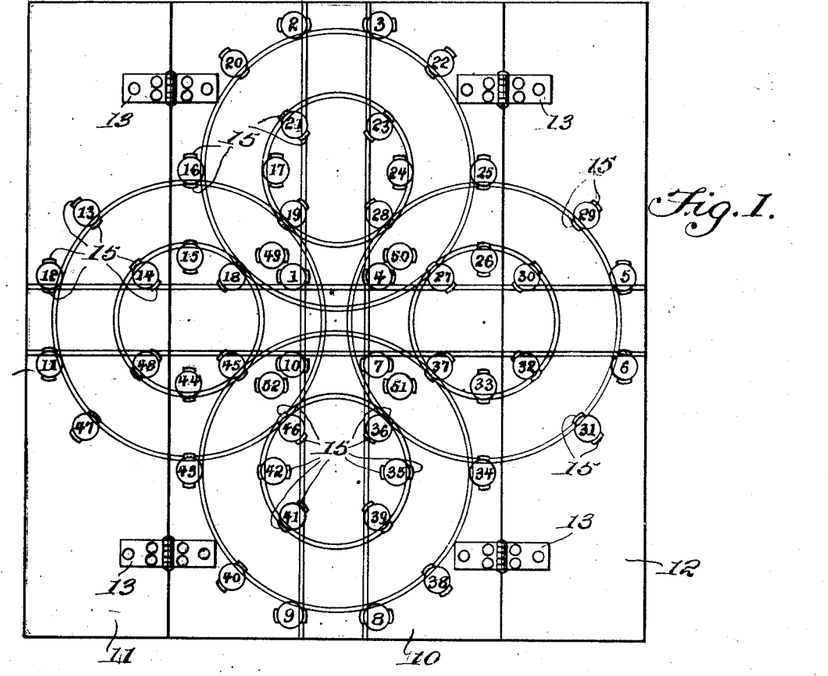
Figure 1 is a plan view, showing especially the lower portion or base, comprising folding sections, and being provided with slotted portions and figures or diagrams, showing how the vertical posts or supporting devices are to be placed.

In Figure 1, I have shown a base member which may be formed of wood, if desired, this element including a central portion 10 and wings 11 and 12 connected with the central portion by means of hinges such as 13. This permits of the folding of the base, for convenience, as in the case of any game board.

On the surface of the base thus constructed, diagrams to be referred to in printed matter accompanying the game, may be painted or otherwise displayed, in order to facilitate the erection of the structure by the players, or by one of them at any time prior to the use thereof for amusement purposes. It is intended to form a device from parts or sections, and the complete structure is to be built up in various ways, according to directions, or developed according to the skill of the user. In the base a plurality of pairs of segmental slots or openings such as 15 are formed in order to permit of the erection of the pillars or vertical posts, constituting important elements of the structure to be erected or built.

Figures 38, 39, 40:
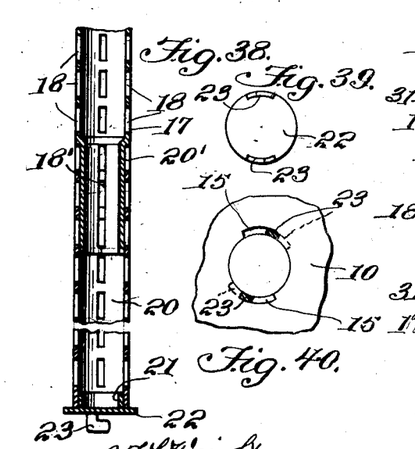
Figure 38 is a view in vertical section showing a joint between two posts in substantially vertical alinement.
Figure 39 is a bottom plan view of the structure of Figure 38.
Figure 40 is a transverse section thru the tongues of the lower element of Figure 38, showing the manner of mounting one of the posts in the segmental slots provided in the wooden or metal base of Figure 1.

The posts are shown in elevation in several views, and a joint between two sections of the post appears in Figure 38, just below Figure 1. In this view an upper post section is designated 17 and is shown as being provided with vertical slots 18, for the accommodation of laterally extending supporting devices illustrated in Figures 41 and 42, also shown below Figure 1. The lower element 20 of the structure of Fig. 38 is broken away, but the extreme lower end receives a flange 21 of supporting member or pillar base 22, the latter having a pair of downwardly extending offset tongues, such as 23, and these elements last named being adapted to be received by the slots 15 of Figure 1, and to form an inter-locking connection, when partial rotation of the posts or pillars is effected. The post sections are each provided with a reduced end portion 20′, and this portion may have a longer slot 18′, permitting of registration with a plurality of slots in the other post section with which it is adapted to have telescoping relation.

Figures 18, 18A, 19, 19A, 20, 21, 21A, 22, 22A, 23, 24, 25, 25A, 26, 26A, 27, 34, 34A, 36, 36A, 37:
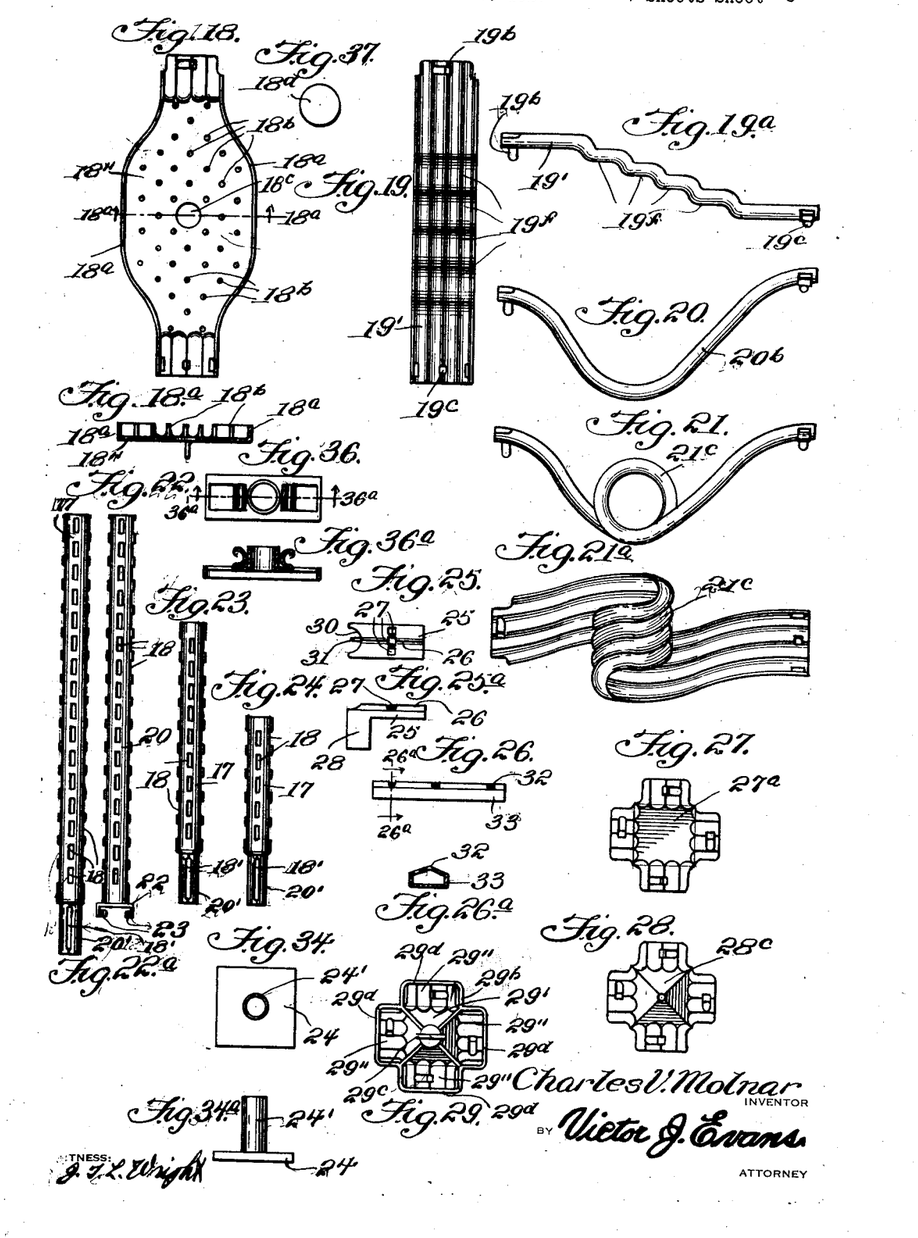

Figures 22, 23 and 24 show post sections of different lengths, adapted for use under different circumstances, in connection with the convenient support of the track elements, and in the lower part of Figure 22 a plurality of tongues 23 formed on the base collar 22, are illustrated.

Figures 34 and 34ᵃ on the same sheet show a pillar base having a flat bottom 24, and tubular portion 24′ adapted to receive the lower end of a post section, this structure being convenient for use when a post is needed at a point where it can directly bear on the base 10, or one of the wings connected therewith.

The laterally extending brackets adapted to support the track structure, and shown in Figures 41 and 42, below Figure 1, are also important features of the construction, and each bracket includes an upper portion or arm 25, bent slightly to provide two inclined surfaces and central ridge 26. A plurality of slots, such as 27 are also provided in the element 25, for receiving downwardly extending tongues carried by the track sections.

Figure 41:
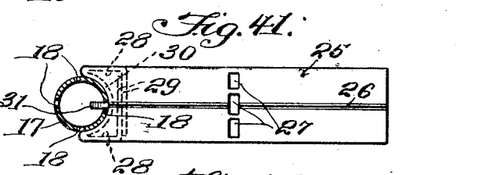
Figure 41 is a transverse section thru one of the posts with a laterally extending arm or bracket in top plan, the latter being designed to support the track sections as in Figure 49.
Figure 42:
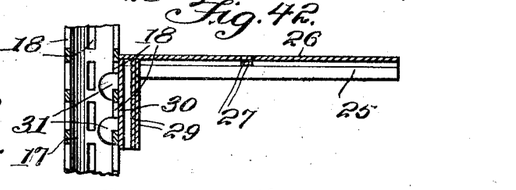
Figure 42 is a longitudinal section thru the bracket of Figure 41, the post to which the bracket is applied being in vertical section.

The bracket includes a downwardly or vertically extending portion, which may be of box-like character, as illustrated in dotted lines in Figure 41, and in vertical section in Figure 42. In Figure 41 the sides of this element are designated 28, and the overlapping portions of the sheet metal of which the device is formed, are shown at 29. An intermediate curved portion 30 corresponds with the curvature of one side of the vertical post or column, and tongues, such as elements 31 extend from portion 30, and constitute hooks or the like adapted to enter the vertical slots 18 of the columns, and to engage, by downward movement, portions of the walls of the columns between the slots 18.

The bracket is further illustrated on sheet 3 of the drawings and in the central portion thereof, where Figures 25 and $25^a$ appear, and below the latter are Figures 26 and $26^a$ showing a bracket extension which may be employed when an element, such as a track section is not intended to be mounted as near to a post as ordinarily. The extension includes a central portion 32 and flanges 33, and the latter are adapted to fit between the flanges of the inclined portions of the bracket per se. Slight bending of the flanges of the brackets provides sufficient engagement.

Figures 43, 44, 45:
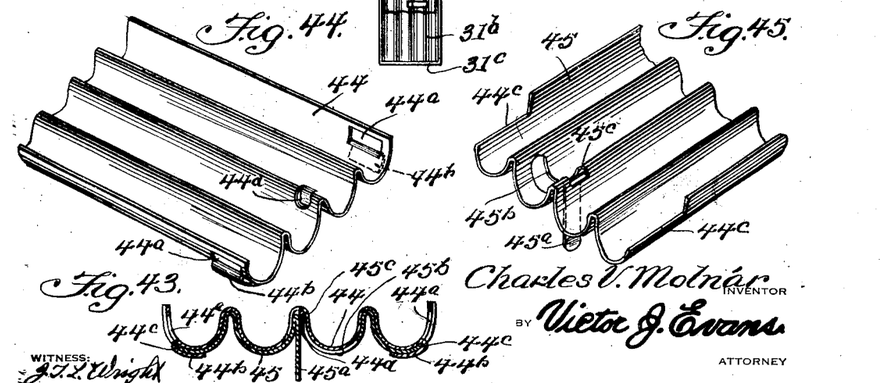
Figure 43 is a transverse section thru one of the track members.
Figure 44 is a perspective view of one of these members.
Figure 45 is a perspective view showing the opposite end portion of each track member, this end portion being complementary to the structure at the right of Figure 44.

In Figures 44 and 45 the complementary ends of two track sections are illustrated, and in Figure 43 a transverse section thru a joint, shows the manner of connecting these sections. The track section 44 is provided with openings at $44^a$, and the metal is downwardly turned, to form a tongue $44^b$ adapted to engage the edge $44^c$ at the cutaway portion of track section 45. These track sections 44 and 45, shown in views of the same number, each comprise a plurality of individual channels with intervening ridges, forming a corrugated device, or devices, so that four parallel tracks are provided in each track member.

In order to provide a downwardly extending tongue $45^a$ for engagement with one of the slots 27 of bracket arm 25,—I cut away the metal as shown at $45^b$ in Figure 45, and this downwardly turned tongue holds the track, at the joint thereof, in position with reference to the bracket and the post or vertical column to which it may be attached. Track section 44 includes a central downwardly extending lug $44^d$, and the latter engages element 45 at the point $45^e$. Interlocking track sections are thus provided, and these may be formed of various types as indicated below, the object being to provide a continuous track built up of individual portions or members.

Figure 47:
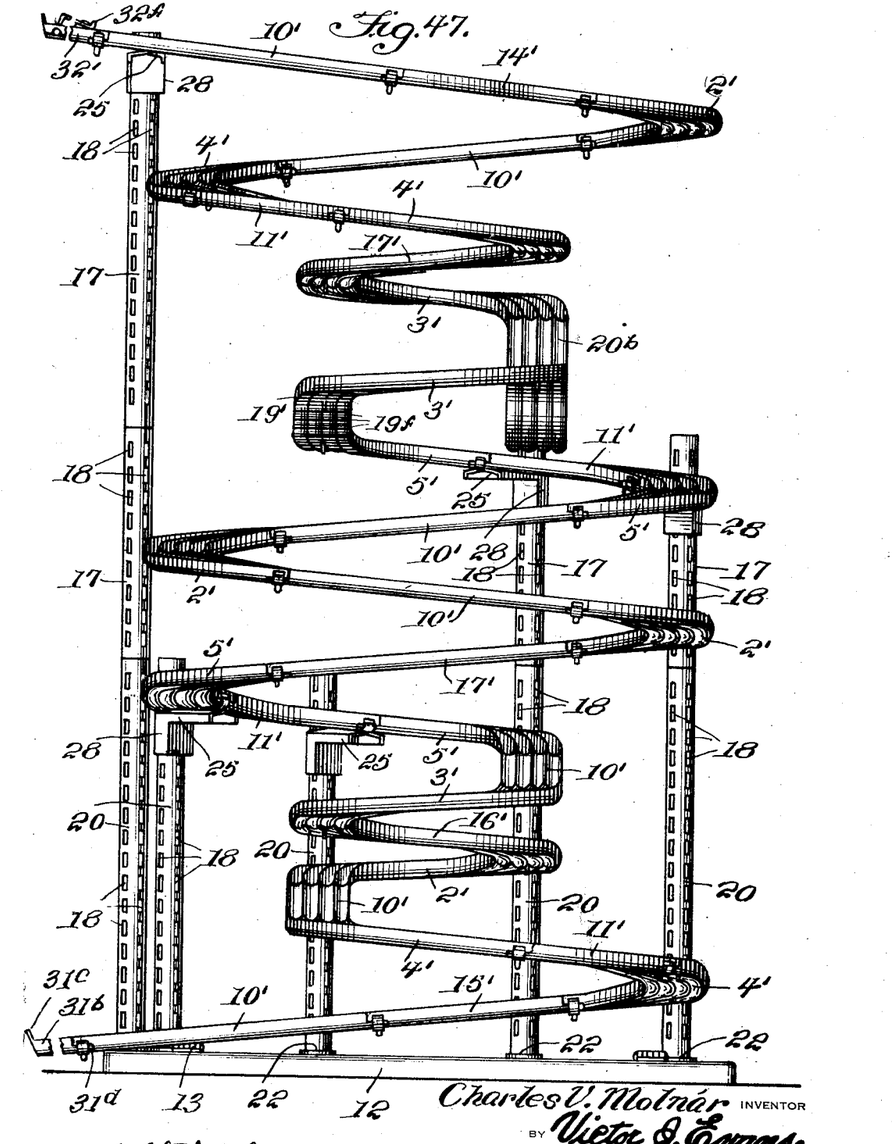
Figure 47 is a view in elevation, representing the same form.

In order to meet a variety of conditions in erecting a track structure of the type shown for instance in Figure 47, I provide the different lengths and curves shown in Figures 2 to 17, and these elements will each be provided with four channels, and will include complementary end portions, so that the sections may inter-lock in a manner similar to that already described, or carrying out a similar principle.

Figures 2, 3, 4, 5, 6, 7, 8, 9, 10, 11, 12, 13, 16, 17:
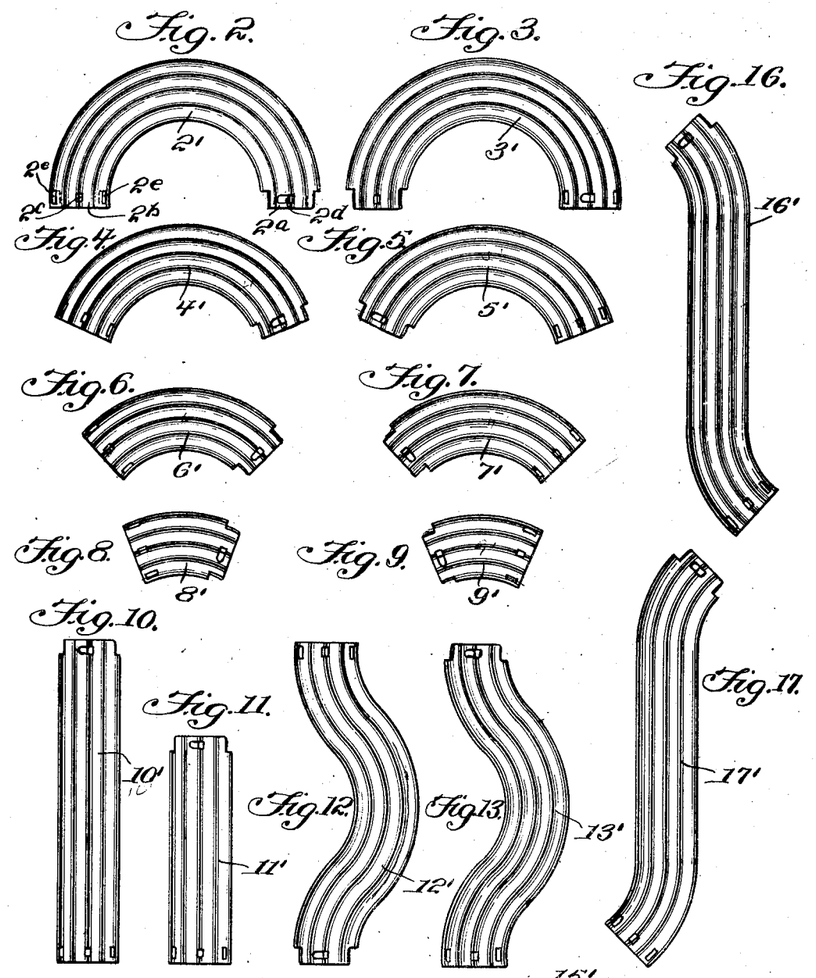
Figures 2 to 17 show various forms of track elements, adapted to meet all conditions, so far as curves and sections of straight track are concerned.
Figure 14:
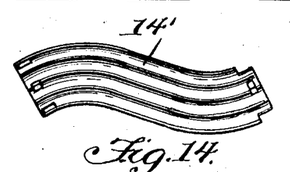
Figure 15:
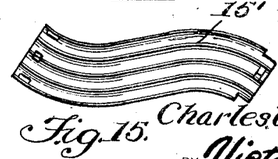

For convenience, these elements are each designated in accordance with the number of the view, but with a prime added, such as 2' for Figure 2. The end carrying the tongue or reduced portion is shown at $2^a$, and the opposite end is designated $2^b$, central slots and lugs, respectively being designated $2^c$ and $2^d$, and outer lugs being shown at $2^e$.

In Figure 3 the complete element constitutes a half circle, in Figure 5, three-eighths of a circle, in Figure 7 the element represents one-quarter of a circle, and in Figure 9, one-eighth of a circle, and the same comment applies to Figures 2, 4, 6 and 8, respectively.

In Figure 18 a special form of track element or retarding device appears, and it is intended that the marbles or other spherical elements employed shall pass thru the device of Figure 18, having complementary end sections for connection with other sections of the track structure,—and as the rolling elements will take different courses, it is partly a matter of chance, so far as the time element is concerned. That is, assuming that all of the marbles are started at the same time, as referred to below, some of them will pass thru the device of Figure 18 by shorter paths than others. The pan-like formation includes a bottom designated 18'', and side flanges $18^a$ having connection with the bottom. Pins $18^b$ constitute the individual retarding devices, and a central opening $18^c$ will permit any marble passing along that path to drop thru, if this opening is not closed, as by means of a disk $18^d$. Marbles dropping out in this manner of course fail to complete the full course of travel, and are thereby eliminated from the scoring.

In Figures 19, $19^a$, 20, 21 and $21^a$ further forms of retarding devices or the like, or devices especially designed to promote interest on the part of the players, are illustrated.

This track section of Figures 19 and $19^a$ is designated 19', and includes the usual complementary end portions for connection with the adjacent track sections. These include the tongues $19^b$ and the lug or lugs $19^c$. Steps are shown at $19^f$, and the marbles will drop from one to another in an obvious manner.

In Figure 20 a dip $20^b$ is illustrated, and in Figure 21 and Figure $21^a$, I have illustrated a loop $21^c$, it being observed that this is more than a simple structure, since provision is made for carrying four moving elements in their respective paths.

Figures 30, 31, 32, 33, 35, 35A, 46:
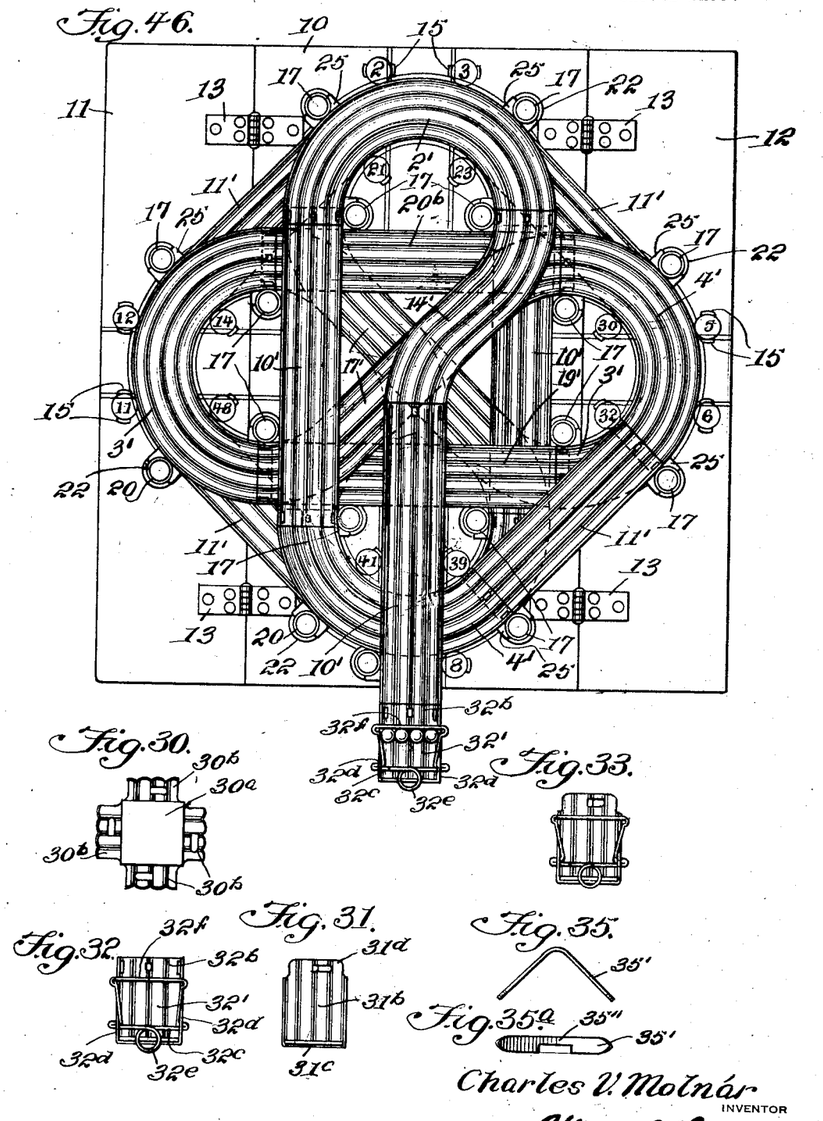
Figure 30 shows the lower element of the structure of Figure 49, and intended to be used interchangeably with other forms.
Figure 31 shows the end element of one of the track sections, as further illustrated at the left of Figure 49.
Figure 32 shows a device which may be termed an entrance pan from which the marbles are to be played.
Figures 35 and 35ᵃ show supporting devices referred to below.
Figure 46 is a top plan view of that form of the complete structure shown in Figure 47.

It will be recalled that Figure 46 is a plan view of the structure shown in elevation in Figure 47, and at the bottom of Figure 46 and at the left of Figure 47, near the top, a starting device, in which the four marbles are placed, is illustrated. This consists of a pan 32', shown for instance in Figure 32 on sheet 4, four channels being provided, and an end section $32^b$ being provided for connection with a track section. A bail frame or the like includes a transverse member $32^c$ pivoted in the side walls $32^d$, and controlled by a loop member $32^e$. The forward part of the bail frame is designated $32^f$ and extends transversely of the pan 32' and retains the marbles until such time as they are to be started together, by pressure upon element 32ᵉ. This raises the element 32ᶠ and allows the marbles to pass directly to the track, and at the same time. The devices thus played will follow parallel paths throughout the course of travel, but they will be retarded slightly in view of the devices already described, and some of them will encounter slightly more frictional resistance than others, and the time required for the movement of the different marbles or other devices will vary slightly, but the one reaching the bottom first will be regarded as scoring, or winning a game, as the case may be. At the lower left portion of Figure 47, and in Figure 31, the final receiving and retaining device 31ᵇ includes an end flange 31ᶜ, and this element has the end portion 31ᵈ for detachable connection with a standard channel or track section.

Figure 48:
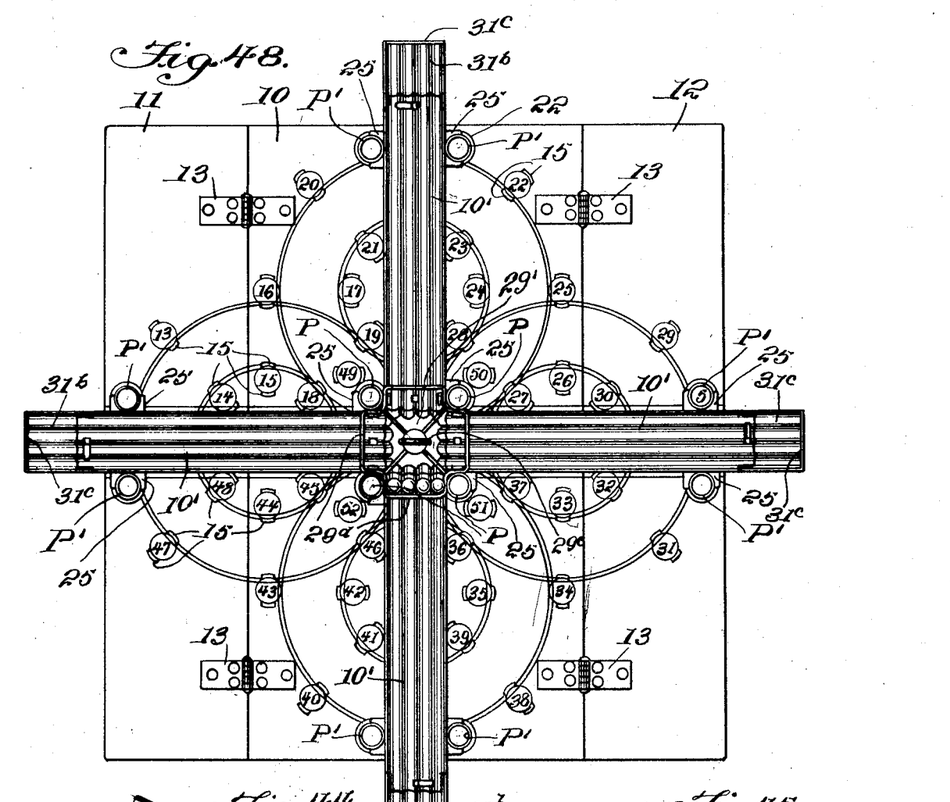
Figure 48 is a top plan view of that form of the complete structure shown in Figure 49.
Figure 49:
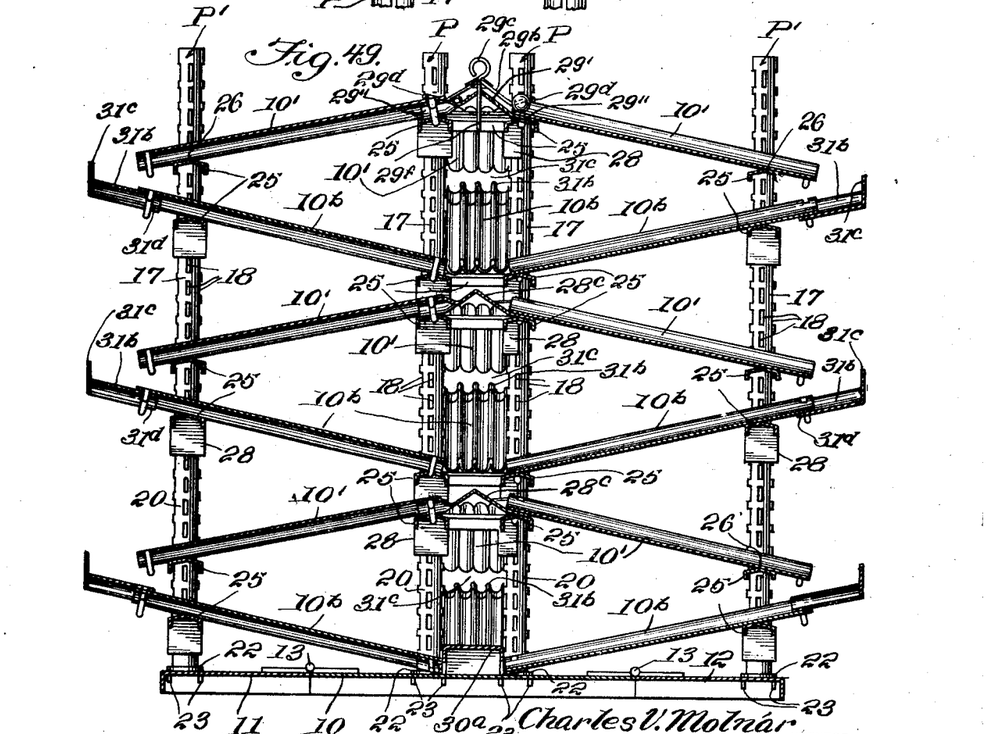
Figure 49 is a view in vertical section, showing the same structure.

In that form of the device shown in Figures 48 and 49 the track sections are straight, and extend toward the center and outwardly from the center, it being the intention that the elements being played shall move in opposite directions from the upper central receptacle, and shall in fact move in four directions from this receptacle, the track sections, as before, each having four channels, so that sixteen players are provided for.

The vertically extending posts at the outer portion of the structure may be formed as before, and in addition thereto a plurality of posts, say four in number are provided at the central portion of the structure. For convenience these posts are designated P, and outwardly extending brackets are carried by the posts and support the straight track section 10'. The upper sections extend outwardly and downwardly from the center posts P, and the next four track sections extend or are inclined inwardly and downwardly from the posts P' toward posts P. The upper central marble receiving device is designated 29', and includes four inclined face portions outwardly and downwardly inclined, and as shown in Figure 29, further includes extensions 29'' with which the track sections are connected, the complementary tongues and slots cooperating as before.

The marbles are temporarily retained by the frame 29ᵇ having a ring portion or handle 29ᶜ at its upper end, and having outer portions 29ᵈ adapted to support the marbles temporarily, until all sixteen of these elements are in playing position, and are to be released at one time by lifting the retaining frame which includes a stem 29ᶠ passing thru an aperture in the upper end of the element immediately beneath.

The marbles pass outwardly and downwardly along the upper track section, and drop into the devices 31ᵇ, corresponding with those previously described in connection with Figure 47, at the lower left hand portion thereof.

Figures 50, 51:
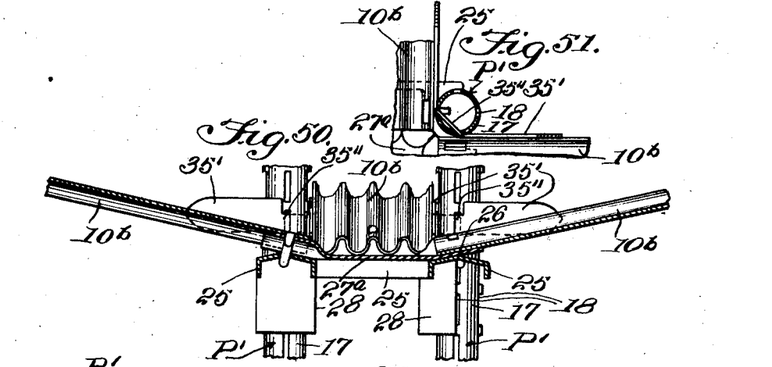
Figure 50 is a detail in section and elevation showing a portion of the structure centrally located in Figure 49.
Figure 51 is a detail transversely of one of the vertical elements, and showing corner connections.

The marbles now move from upper track sections 10' to inwardly and downwardly inclined track sections 10ᵇ, after leaving the element 31ᵇ mounted as just indicated. These track sections 10ᵇ extend forward and discharge into devices 28ᶜ, and pass thence to another of the outwardly and downwardly extending track elements, this movement being continued until the lower inwardly inclined track element 10ᵇ is reached, the marbles being received within the central receptacle 30ᵃ, and the first element so played reaching this point, scoring, or winning a game, as the case may be. The dished element 27ᵃ of Figure 27 may be employed where desirable, and it should be understood that the type of the structure, or that portion in use at a given time, may be varied as desired. The outwardly extending tongues, better termed extensions, are shown at 30ᵇ. Detachable wings or guard members for any of the center pieces are designated 35', and are shown in Figures 35, 35ᵃ and 50, these elements being of angular form and including tongues 35'' adapted to enter slots in the posts P.

Other structures may be built up in a similar manner, or by carrying out the principles above indicated. In Figure 51 the relation of the track sections to posts P' is illustrated in section, with parts in top plan, as shown by the reference numbers there applied.

Having described the invention what is claimed is:—

1. In a device of the class described, a base, posts each provided with a plurality of slots extending lengthwise of the posts, means carried by the posts for engaging the base, brackets each including engaging devices adapted for reception within the slots of the posts, on any side of said posts, track elements connected with the brackets, said track elements each comprising channeled sections, and adjacent sections having complementary engaging devices for effecting connection between the sections, and means connected with the end portions of the upper and lower track sections, respectively, and having complementary engaging devices for effecting connection with said sections, and means communicating with corresponding ends of a plurality of channels for accommodating articles movable through the channels.

2. In a device of the class described, a base, posts detachably mounted on the base and extending upwardly therefrom, means for supporting track sections at different elevations and inclinations, and on different sides of the posts these means including brackets extending laterally from the posts and having detachable connection therewith, said brackets including track engaging portions, track sections carried by the brackets, and each formed with channels, a ball receiving device connected with the upper end of the upper channeled element, and a movable ball retaining device for temporarily holding from and releasing the balls to said track sections.

3. In a device of the class described, a base, posts extending upwardly from the base, brackets on the posts, and track sections connected with the brackets and connected respectively with each other, approaching ends of adjacent track sections, constituting channels, being formed respectively with projecting elements and cutaway portions engaged by the projecting elements, and one of the ends including a downwardly extending tongue adapted to engage a bracket by which it is carried, and means communicating with corresponding ends of a plurality of channels for accommodating articles movable through the channels.

4. In a device of the class described, a base, posts extending upwardly from the base, supporting devices extending laterally from the posts, means between said devices and posts providing inter-locking connection on any side of these posts, track sections, constituting channels, carried by the devices extending laterally from the posts, said sections each including complementary end portions, one of these end portions including a slot approximately centrally thereof and a tongue extending downwardly from the edge of the slotted portion and thru one of the laterally extending devices on the post, the other of said complementary end portions including a downwardly extending lug adapted to enter the slotted portion of the other track section, and means communicating with corresponding ends of a plurality of channels for accommodating articles movable through the channels.

5. In a device of the class described, a structure including uprights, supporting devices extending laterally from the uprights, track sections connected with said devices, and each provided with channels extending alongside of each other, said track sections being positioned at different angles with reference to each other, and means interposed between adjacent sections, retarding the movement of a device passing along the track sections under the action of gravity, the retarding means including surfaces extending in different directions, and changing the direction of travel of the device moving along the track, in separate paths.

6. In a device of the class described, a structure including a base and uprights mounted on the base, an upper central ball receiving device including means for controlling a plurality of series of balls, with the balls of each series movable in separate paths simultaneously, track sections connected with this receiving device and extending outwardly to the uprights, these track sections being inclined outwardly and downwardly, another track section into which those first named discharge, the second named track section extending inwardly and downwardly, and means between approaching ends of inwardly extending track sections for receiving elements moving by gravity along said sections.

7. In a device of the class described, a base, posts carried by the base, an upper central ball receiving device having laterally extending discharge portions, track sections extending in a plurality of directions from the discharge portions and inclined outwardly and downwardly to the posts, ball retaining means for temporarily holding balls received by said central device and at the entrance of the track sections, and other track sections mounted below the outer discharge ends of the sections first named and extending inwardly and downwardly to a common point, a ball spreading device at said common point of meeting of the track sections, and other track sections extending at various angles between the center of the structure defined by the posts to said posts, and a final receptacle into which the balls are deposited.

In testimony whereof I affix my signature.

Rev. CHARLES V. MOLNÁR.